United States Patent
Tränk et al.

(10) Patent No.: US 10,848,369 B2
(45) Date of Patent: *Nov. 24, 2020

(54) SERVICE INTERRUPTION REPORTING

(71) Applicant: Telefonaktiebolaget LM Ericsson (publ), Stockholm (SE)

(72) Inventors: Magnus Tränk, Lerum (SE); Joakim Åkesson, Landvetter (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/392,811

(22) Filed: Apr. 24, 2019

(65) Prior Publication Data
US 2019/0253307 A1   Aug. 15, 2019

Related U.S. Application Data

(63) Continuation of application No. 15/539,178, filed as application No. PCT/EP2016/076275 on Nov. 1, 2016, now Pat. No. 10,348,552.

(51) Int. Cl.
*H04L 12/28* (2006.01)
*H04L 12/24* (2006.01)
(Continued)

(52) U.S. Cl.
CPC ........ *H04L 41/0604* (2013.01); *H04L 12/189* (2013.01); *H04L 12/1868* (2013.01); *H04L 41/0672* (2013.01); *H04L 43/028* (2013.01); *H04W 4/08* (2013.01); *H04L 41/0681* (2013.01); *H04L 43/06* (2013.01); *H04L 43/0823* (2013.01); *H04L 67/10* (2013.01)

(58) Field of Classification Search
CPC ...... H04L 12/18; H04W 72/00; H04W 72/005
USPC .................... 370/252, 216, 241, 329, 386
See application file for complete search history.

(56) References Cited

U.S. PATENT DOCUMENTS

| 9,826,502 B2 | 11/2017 | Cherian et al. |
| 9,883,355 B2 | 1/2018 | Lee et al. |

(Continued)

FOREIGN PATENT DOCUMENTS

| CN | 101242569 A | 8/2008 |
| EP | 2827620 A1 | 1/2015 |
| WO | 2012126210 A1 | 9/2012 |

OTHER PUBLICATIONS

3rd Generation Partnership Project, "3rd Generation Partnership Project; Technical Specification Group Services and System Aspects; Study on Multimedia Broadcast and Multicast Service (MBMS) Usage for Mission Critical Communication Services (Release 14)", Technical Report, 3GPP TR 23.780 V1.1.0, Oct. 1, 2016, pp. 1-68, 3GPP.

*Primary Examiner* — John Pezzlo
(74) *Attorney, Agent, or Firm* — Coats & Bennett, PLLC

(57) ABSTRACT

There is provided mechanisms for service interruption reporting of a multicast bearer for group communications. A method is performed by a client node. The method comprises obtaining instruction from a control node of the multicast bearer, where the instruction instructs whether or not the client node is to report service interruption of the multicast bearer. The method comprises detecting service interruption of the multicast bearer. The method comprises selectively reporting the service interruption to the control node in accordance with the instruction.

22 Claims, 5 Drawing Sheets

(51) Int. Cl.
*H04L 12/18* (2006.01)
*H04L 12/26* (2006.01)
*H04W 4/08* (2009.01)
H04J 1/16 (2006.01)
H04L 29/08 (2006.01)

(56) References Cited

U.S. PATENT DOCUMENTS

| | | |
|---|---|---|
| 2007/0124774 A1 | 5/2007 | Roberts et al. |
| 2007/0271189 A1* | 11/2007 | Morten .................. G06F 21/10 |
| | | 705/57 |
| 2009/0196213 A1* | 8/2009 | Zhong .................. H04W 36/06 |
| | | 370/312 |
| 2011/0305183 A1 | 12/2011 | Hsu et al. |
| 2013/0215761 A1 | 8/2013 | Xu et al. |
| 2016/0094358 A1 | 3/2016 | Won et al. |
| 2016/0316345 A1* | 10/2016 | Shauh ................. H04L 65/4076 |
| 2016/0374050 A1* | 12/2016 | Prasad .................... H04W 4/06 |
| 2016/0374104 A1 | 12/2016 | Watfa et al. |
| 2016/0380919 A1* | 12/2016 | Wang ................. H04L 65/4076 |
| | | 370/312 |

* cited by examiner

SERVICE INTERRUPTION REPORTING

RELATED APPLICATIONS

This application is a Continuation of U.S. patent application Ser. No. 15/539178 filed Jun. 23, 2017, which is the National Stage of International Patent Application No. PCT/EP2016/076275 filed Nov. 1, 2016, the contents of each of which are hereby incorporated by reference in their entirety.

TECHNICAL FIELD

Embodiments presented herein relate to methods, a client node, a control node, computer programs, and a computer program product for service interruption reporting of a multicast bearer for group communications.

BACKGROUND

In communications systems, there may be a challenge to obtain good performance and capacity for a given communications protocol, its parameters and the physical environment in which the communications system is deployed.

An example of applications available in some communications system is group communications services. In general terms, group communication means that the same information or media is delivered to multiple client nodes (as hosted by wireless devices).

In group communication systems the client nodes receiving the same media constitute a group of client nodes. These client nodes may be located at different locations in a radio coverage area served by one or more radio access network nodes. If many client nodes are located within the same area, the one or more radio access network nodes could use multicast or broadcast based transmission using e.g., Multicast-Broadcast Multimedia Services (MBMS) for efficient communication to the group of client nodes since communications resources, such as time and frequency resources, are shared among the client nodes.

Some activities are performed before MBMS can be used. One activity involves an MBMS bearer to be activated. This will enable media to be sent over the network and broadcasted over the radio network to the client nodes. In a third generation partnership project (3GPP) Long Term Evolution (LTE) network this is initiated in a Broadcast Multicast Service Center (BMSC) as discussed in document 3GPP TS 23.246 v14.0.0. Another activity is to inform the client nodes of the service being broadcasted over the MBMS bearer. This activity is performed in order for the client nodes to know how to receive the media over the MBMS bearer. This procedure is commonly known as a service announcement procedure and is discussed, e.g., in document 3GPP TS 26.346 v14.0.0 which relates to service announcement in LTE networks.

MBMS provides a one-way communication channel, meaning that the data is broadcasted from a radio access network node towards wireless devices hosting client nodes. When a wireless device that receives data over an MBMS bearer is moving closer to the border of the broadcast area of the MBMS bearer in the radio access network node, the wireless device will request to receive the group communication data over a unicast bearer instead of as before via broadcast.

However, there is a risk that the MBMS bearer is suspended or otherwise interrupted. Suspension of MBMS bearer could cause problems not only for the client nodes but for the communications system as a whole. MBMS bearers are examples of multicast bearers.

US 2016/094358 A1 discloses a broadcast resource congestion control method of a multi-cell/multicast coordination entity (MCE). The disclosure is concerned with notifying a group communication content server (GCS AS) as opposed to a multicast control node in order to inform this content source about an imminent suspension of a bearer.

3GPP TR 23.780 V1.1.0, 19 Oct. 2016, also relates to congestion related MBMS bearer suspension reporting by user equipment to a GCS AS.

EP 2 827 620 A1 is directed at network (e.g. eNodeB, MCE) initiated service status queries of, e.g. a wireless client, wherein the network sends MBMS service status queries to the wireless client, which are responded to with MBMS status reports, these reports are concerned with MBMS service status rather than MBMS bearer suspension.

Hence, there is still a need for an improved handling of interruptions of multicast bearers.

SUMMARY

An object of embodiments herein is to improve handling of interruptions of a multicast bearer.

According to a first aspect there is presented a method for service interruption reporting of a multicast bearer for group communications. The method is performed by a client node. The method comprises obtaining instruction from a control node of the multicast bearer, where the instruction instructs whether or not the client node is to report service interruption of the multicast bearer. The method comprises detecting service interruption of the multicast bearer. The method comprises selectively reporting the service interruption to the control node in accordance with the instruction.

Advantageously, this method (as well as the client nodes according to the below second aspect, third aspect, and fourth aspect, and the computer program of the below fifth aspect) enables the client node to know if it is to report any service interruption of the multicast bearer or not.

According to a second aspect there is presented a client node for service interruption reporting of a multicast bearer for group communications, the client node comprising processing circuitry. The processing circuitry is configured to cause the client node to obtain instruction from a control node of the multicast bearer, where the instruction instructs whether or not the client node is to report service interruption of the multicast bearer. The processing circuitry is configured to cause the client node to detect service interruption of the multicast bearer. The processing circuitry is configured to cause the client node to selectively report the service interruption to the control node in accordance with the instruction.

According to a third aspect there is presented a client node for service interruption reporting of a multicast bearer for group communications. The client node comprises processing circuitry and a storage medium. The storage medium stores instructions that, when executed by the processing circuitry, cause the client node to perform operations, or steps. The operations, or steps, cause the client node to obtain instruction from a control node of the multicast bearer, where the instruction instructs whether or not the client node is to report service interruption of the multicast bearer. The operations, or steps, cause the client node to detect service interruption of the multicast bearer. The operations, or steps, cause the client node to selectively report the service interruption to the control node in accordance with the instruction.

According to a fourth aspect there is presented a client node for service interruption reporting of a multicast bearer for group communications. The client node comprises an obtain module configured to obtain instruction from a control node of the multicast bearer, where the instruction instructs whether or not the client node is to report service interruption of the multicast bearer. The client node comprises a detect module configured to detect service interruption of the multicast bearer. The client node comprises a report module configured to selectively report the service interruption to the control node in accordance with the instruction.

According to a fifth aspect there is presented a computer program for service interruption reporting of a multicast bearer for group communications, the computer program comprising computer program code which, when run on processing circuitry of a client node, causes the client node to perform a method according to the first aspect.

According to a sixth aspect there is presented a method for service interruption reporting of a multicast bearer for group communications, the method being performed by a control node of the multicast bearer. The method comprises transmitting instruction whether or not a client node listening to the multicast bearer is to report service interruption of the multicast bearer. The method comprises obtaining reporting of service interruption of the multicast bearer from the client node instructed to report failure of the multicast bearer.

Advantageously, this method (as well as the control nodes according to the below seventh aspect, eighth aspect, and ninth aspect, and the computer program of the below tenth aspect) enables the control node to determine that less than all of the client nodes listening to the multicast bearer are to report any service interruption of the multicast bearer.

According to a seventh aspect there is presented a control node for service interruption reporting of a multicast bearer for group communications. The control node comprises processing circuitry. The processing circuitry is configured to cause the control node to transmit instruction whether or not a client node listening to the multicast bearer is to report service interruption of the multicast bearer. The processing circuitry is configured to cause the control node to obtain reporting of service interruption of the multicast bearer from the client node instructed to report failure of the multicast bearer.

According to an eighth aspect there is presented a control node for service interruption reporting of a multicast bearer for group communications. The control node comprises processing circuitry and a storage medium. The storage medium stores instructions that, when executed by the processing circuitry, cause the control node to perform operations, or steps. The operations, or steps, cause the control node to transmit instruction whether or not a client node listening to the multicast bearer is to report service interruption of the multicast bearer. The operations, or steps, cause the control node to obtain reporting of service interruption of the multicast bearer from the client node instructed to report failure of the multicast bearer.

According to a ninth aspect there is presented a control node for service interruption reporting of a multicast bearer for group communications. The control node comprises a transmit module configured to transmit instruction whether or not a client node listening to the multicast bearer is to report service interruption of the multicast bearer. The control node comprises an obtain module configured to obtain reporting of service interruption of the multicast bearer from the client node instructed to report failure of the multicast bearer.

According to a tenth aspect there is presented a computer program for service interruption reporting of a multicast bearer for group communications, the computer program comprising computer program code which, when run on processing circuitry of a control node, causes the control node to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these client nodes, these control nodes, and these computer programs enable efficient handling of interruptions of multicast bearers.

Advantageously these methods, these client nodes, these control nodes, and these computer programs enable efficient notification reporting from client nodes that are listening on a multicast bearer, such as an MBMS bearer, particularly in scenarios where the multicast bearer is suspended, or by other means interrupted, and this interruption is known to the client node as not being caused by network failure.

Advantageously these methods, these client nodes, these control nodes, and these computer programs reduce the risk of mass notification in MBMS failure scenarios.

It is to be noted that any feature of the first, second, third, fourth, fifth, sixth seventh, eighth, ninth, tenth and eleventh aspects may be applied to any other aspect, wherever appropriate. Likewise, any advantage of the first aspect may equally apply to the second, third, fourth, fifth, sixth, seventh, eighth, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
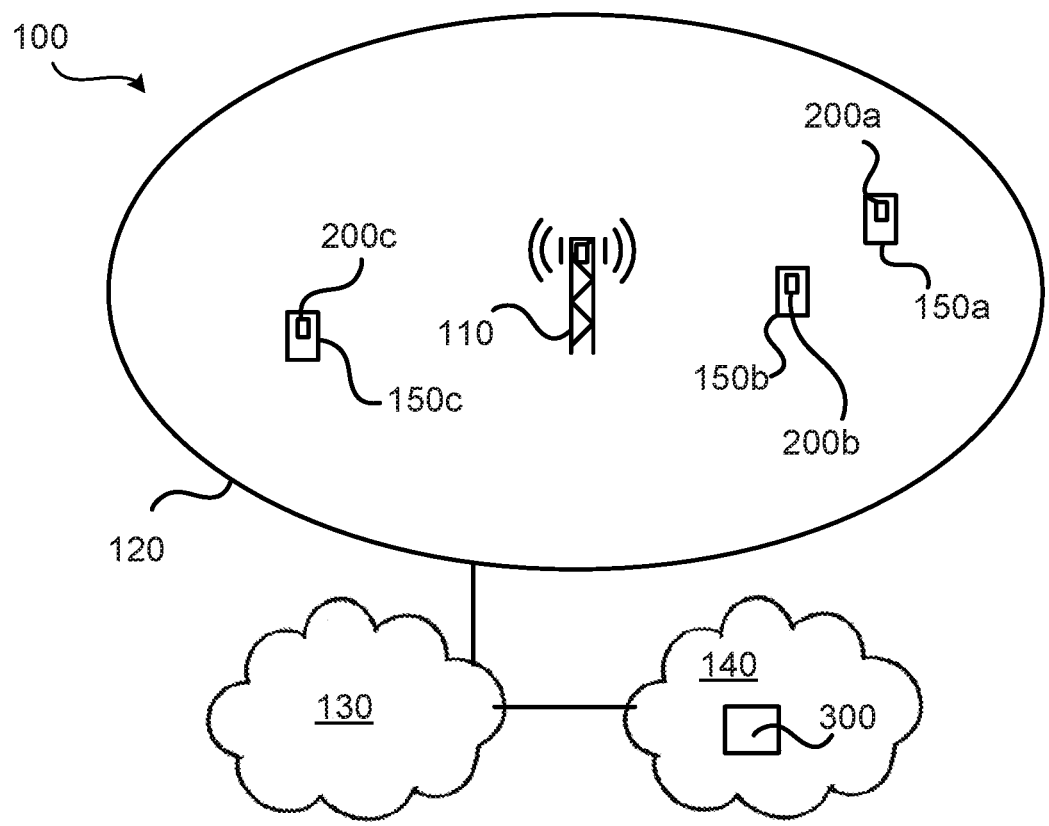
FIG. 1 is a schematic diagram illustrating a communications system according to embodiments.

FIG. 1 is a schematic diagram illustrating a communications system 100 where embodiments presented herein can be applied. The communications system 100 is assumed to provide services for group communication and may hence be regarded as a group communications system. The group communications system 100 is, according to some aspects, a push to talk (PTT) system. The group communication could thus comprise a push to talk service.

The communications system 100 comprises a radio access network (as represented by its radio coverage area 120), a core network 130, and a service network 140. The communications system 100 further comprises at least one control node 300 and at least one client node 200a, 200b, 200c. Each client node 200a, 200b, 200c could be a mission critical (MC) service client. The at least one control node 300 may be provided in, or installed on, at least one radio access network (RAN) node 110 or in another entity or device in the radio access network, in an entity or device of the core network 130, or in an entity or device of the service network 140. The at least one control node 300 could implement the functionality of a group communication service application server (GCS AS) and be a MC service server. Each client node 200a, 200b, 200c may be hosted by, provided in, or installed on, a respective wireless device 150a, 150b, 150c.

The radio access network is operatively connected to the core network 130 which in turn is operatively connected to the service network 140. The at least one radio access network node 110 thereby enables the wireless devices 150a, 150b, 150c, and hence the client nodes 200a, 200b, 200c, to access services and exchange data as provided by the service network 140. It is appreciated that core network 130 and the service network 140 can be implemented on a common platform, i.e., not necessarily on separate hardware.

Examples of wireless devices 150a, 150b, 150c include, but are not limited to, mobile stations, mobile phones, handsets, wireless local loop phones, user equipment (UE), smartphones, laptop computers, and tablet computers. Examples of radio access network nodes 110 include, but are not limited to, radio base stations, base transceiver stations, node Bs, evolved node Bs, and access points. As the skilled person understands, the communications system 100 may comprise a plurality of radio access network nodes 110, each providing network access to a plurality of wireless devices 150a, 150b, 150c. The herein disclosed embodiments are not limited to any particular number of radio access network nodes 110, client nodes 200a, 200b, 200c, or wireless devices 150a, 150b, 150c.

As disclosed above, in a group communication system (e.g. a PTT system) it is common to use a broadcast technology such as MBMS. Using MBMS allows group communication data to be broadcasted while the wireless devices 150a, 150b, 150c are in idle mode, i.e. only listening to the broadcasted data.

In some communications systems the radio access network may suspend MBMS bearers without sending any MBMS bearer suspension decision information to the control node 300. MBMS bearer suspension is described in 3GPP TS 36.300 v14.0.0.

When using MBMS for group communications many client nodes 200a, 200b, 200c could be listening to the MBMS bearer. In a scenario where the MBMS bearer is suspended, or by other means is taken down, there could thus be a risk that all client nodes 200a, 200b, 200c simultaneously initiate actions to re-initiate the communication. Such action may involve establishing unicast transmission links between radio access network node 110 and wireless devices 150a, 150b, 150c. This may cause an overload scenario due to too many client nodes 200a, 200b, 200c requesting network resources of the radio access network 120 at the or approximately the same time.

In order to avoid such an overload scenario only a subset of the client nodes 200a, 200b, 200c can be configured to initiate unicast transmission, whereas the remaining the client nodes 200a, 200b, 200c could be configured to refrain from initiating unicast transmission. Alternatively, some client nodes 200a, 200b, 200c could be suspended by the control node 300 from initiating unicast transmission. However, this could lead to uncertainties whether a particular client nodes 200a, 200b, 200c should initiate uncast transmission or not.

According to the embodiments disclosed herein the control node 300 instructs the client nodes 200a, 200b, 200c whether or not the client nodes 200a, 200b, 200c is to report service interruption. The instruction thereby causes only a subset of all client nodes 200a, 200b, 200c to report bearer failure in cases when the multicast bearer failure is caused by a network issue. The embodiments disclosed herein in particular relate to mechanisms for service interruption reporting of a multicast bearer for group communications. In order to obtain such mechanisms there is provided a client node 200a, a method performed by the client node 200a, a computer program product comprising code, for example in the form of a computer program, that when run on processing circuitry of the client node 200a, causes the client node 200a to perform the method. In order to obtain such mechanisms there is further provided a control node 300, a method performed by the control node 300, and a computer program product comprising code, for example in the form of a computer program, that when run on processing circuitry of the control node 300, causes the control node 300 to perform the method.

Figure 2:
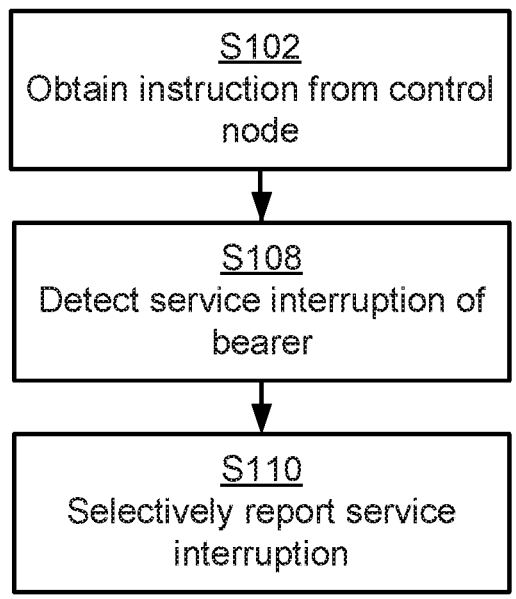
FIGS. 2, 3, 4, and 5 are flowcharts of methods according to embodiments.
Figure 3:
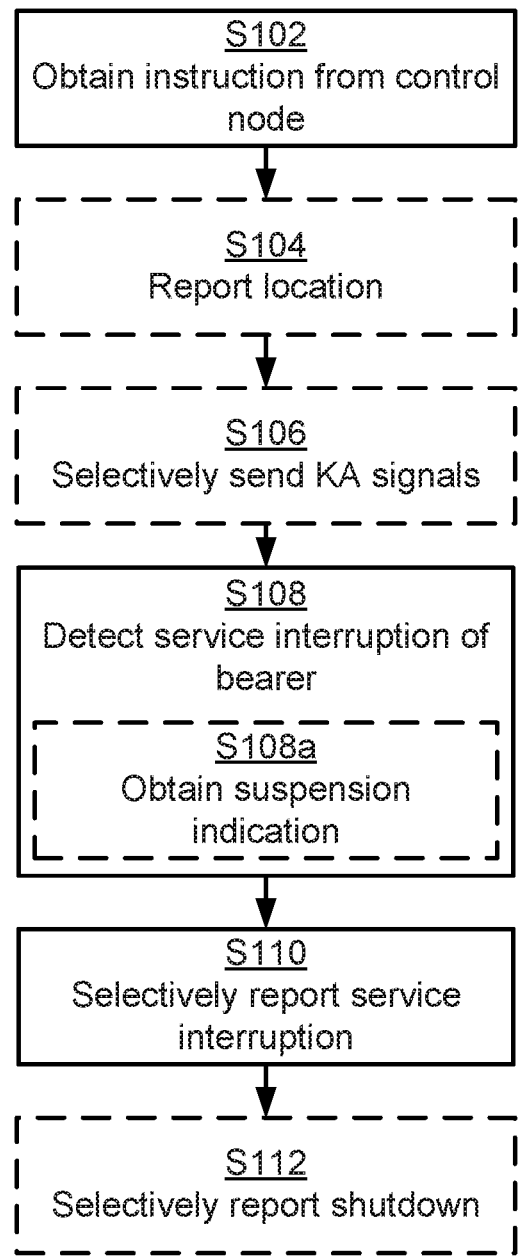
Figure 4:
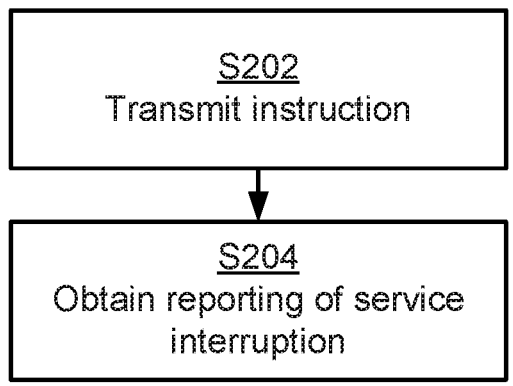
Figure 5:
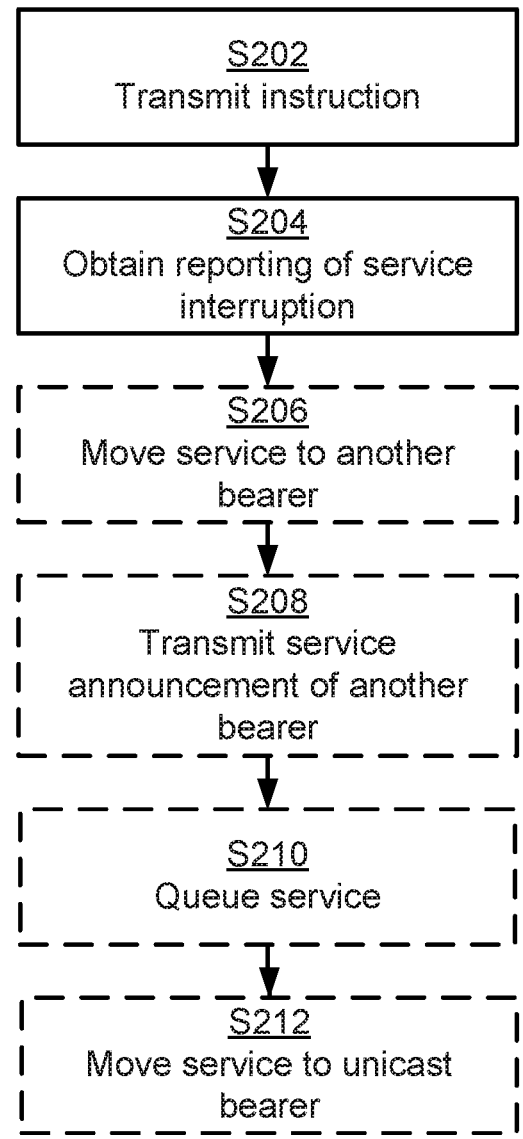

FIGS. 2 and 3 are flow charts illustrating embodiments of methods for service interruption reporting of a multicast bearer for group communications as performed by the client node 200a. FIGS. 4 and 5 are flow charts illustrating embodiments of methods for service interruption reporting of a multicast bearer for group communications as performed by the control node 300. The methods are advantageously provided as computer programs 1120a, 1120b (see, FIG. 11 below).

Reference is now made to FIG. 2 illustrating a method for service interruption reporting of a multicast bearer for group communications as performed by the client node 200a according to an embodiment.

As will be disclosed below, the control node 300 in step S202 instructs the client nodes 200a, 200b, 200c whether or not to report service interruption of the multicast bearer. Hence, the client node 200a is configured to perform step S102:

S102: The client node 200a obtains instruction from the control node 300 of the multicast bearer. The instruction instructs whether or not the client node 200a is to report service interruption of the multicast bearer.

Examples of how and when the instruction could be obtained will be provided below. The instruction obtained in step S102 could explicitly instruct the client node 200a to report the service interruption to the control node 300. Alternatively, there is no explicit instruction regarding to what network entity or node the client node 200a is to report the service interruption to and in such cases the client node 200a could be configured to assume that the service interruption is to be reported to the sender of the instruction, namely the control node 300.

It is assumed that there is a service interruption of the multicast bearer. Hence, the client node 200a is configured to perform step S108:

S108: The client node 200a detects service interruption of the multicast bearer.

Examples of service interruption will be provided below. Such a service interruption could be detected by all client nodes 200a, 200b, 200c listening to the multicast bearer. But according to the instruction obtained in step s102 not all client nodes 200a, 200b, 200c are to report the service interruption to the control node 300. Particularly, the client node 200a is configured to report the service interruption according to step S110:

S110: The client node 200a selectively reports the service interruption to the control node 300 in accordance with the instruction. That is, to selectively report is here to be understood as the client node 200a reports the service interruption if the instruction obtained in step S102 instructs the client node 200a to do so and refrains from such reporting if the instruction obtained in step S102 instructs the client node 200a to not report the service interruption. That is, the instruction could instruct not only those client nodes that are to report the service interruption to actually do so, but also to instruct those client nodes that are not to report the service interruption to actually not to report the service interruption. Hence, although all client nodes 200a, 200b, 200c may obtain the instructions in step S102, not all client nodes 200a, 200b, 200c will report the service interruption in step S110.

Embodiments relating to further details of service interruption reporting of a multicast bearer for group communications as performed by the client node 200a will now be disclosed.

Reference is now made to FIG. 3 illustrating methods for service interruption reporting of a multicast bearer for group communications as performed by the client node 200a according to further embodiments. It is assumed that steps S102, S108, S110 are performed as described above with reference to FIG. 2 and a thus repeated description thereof is therefore omitted.

There could be different ways for the client node 200a to obtain the instruction in step S102. According to an embodiment the instruction is obtained during a service announcement procedure of the multicast bearer. According to another embodiment the instruction is obtained in a service announcement update of the multicast bearer, where the service announcement update could be based on a listening report. The service announcement procedure and the listening report could be performed as discussed in 3GPP TS 23.179 v13.3.0 (where the listening report is called MBMS listening status report). As an example, the instruction in step S102 could be obtained as a request for an MBMS suspension report and the service announcement procedure could be an MBMS bearer announcement procedure.

There could be different ways for the client node 200a to report the service interruption in step S110. According to an embodiment the service interruption is reported in a multicast bearer suspension report. According to another embodiment the service interruption is reported in a multicast bearer in a listening report. As an example, the instruction obtained in step S102 could instruct the client node 200a to report the service interruption in an MBMS suspension report.

According to some aspects, all client nodes 200a, 200b, 200c listening to the multicast bearer could report their current location to the control node 300. As will be further disclosed below, such location information could by the control node 300 be used to determine which client nodes that are to report the service interruption. Hence, according to an embodiment the instruction further instructs the client node 200a to report location and the client node 200a is configured to perform step S104:

S104: The client node 200a reports location of the client node 200a to the control node 300 in accordance with the instruction. The reporting of location could be performed periodically when the client node 200a listens to the multicast bearer.

There could be ways for the control node 300a to keep track of those client nodes 200a that are instructed to report service interruption of the multicast bearer.

According to some aspects the client node 200a continuously sends keepalive (KA) signals to the control node 300. Such KA signals could by the control node 300 be used to verify that the client node 200a still listens to the multicast bearer and hence still is capable of detecting service interruption of the multicast bearer. Thus, it is appreciated that a KA signal can be any signal which enables the control node 300 to verify that the client node 200a is still capable of detecting service interruption of the multicast bearer. Hence, according to an embodiment the instruction further instructs the client node 200a to send KA signals if the client node 200a is instructed to report service interruption of the multicast bearer and the client node 200a is configured to perform step S106:

S106: The client node 200a selectively sends the KA signals to the control node in accordance with the instruction. Selectively sends is here to be construed as in the above discussed step of selectively reporting (S110).

Absence of KA signals from a client node 200a instructed to send KA signals could by the control node 300 be used to conclude that the client node 200a no longer is capable of detecting service interruption of the multicast bearer, and/or is no longer able to report service interruption.

According to some aspects the client node 200a reports to the control node 300 if the client node 200a is shut down or is about to be shut down. Such a report of the shutdown of the client node 200a could by the control node 300 be used to conclude that the client node 200a no longer is capable of detecting service interruption of the multicast bearer and/or is no longer able to report service interruption. Hence, according to an embodiment the instruction further instructs the client node 200a to report shutdown if the client node 200a is instructed to report service interruption of the multicast bearer and the client node 200a is configured to perform step S112:

S112: The client node 200a selectively reports shutdown of the client node 200a to the control node 300 in accordance with the instruction. Selectively report here has the same understanding as the above disclosed selectively report in step S110.

Shutdown is here to be construed broadly to incorporate any configuration or re-configuration of the client node 200a which is preventing the client node 200a from detecting service interruption of the multicast bearer and/or from reporting service interruption. Examples include, e.g., selectively disabling a radio transceiver or the wireless device 150a, for example by setting the wireless device 160 in so called flight mode, or knowingly entering a location with poor or non-existent network coverage, such as going underground or into a tunnel (with the wireless device 150a).

It is understood that there could be scenarios where the client node 200a is unable to perform such reporting, such as if the power source of the client node 200a is suddenly removed. In such cases the control node 300 could rely on receiving KA signals from the client node 200a as disclosed above and hence be configured to assume that the client node 200a is shut off if KA signals are no longer sent from the client node 200a.

There could be different ways for the client node 200a to detect the service interruption. According to some aspects the client node 200a receives a suspension indication from the radio access network node 110. Hence, according to an embodiment the client node 200a is configured to detect the service interruption of the multicast bearer in step S108 by performing step S108a:

S108a: The client node 200a obtains a suspension indication of the multicast bearer from a radio access network node 110 of the multicast bearer.

Step S108a could be performed as part of S108.

The suspension indication could be included in a scheduling information packet.

Reference is now made to FIG. 4 illustrating a method for service interruption reporting of a multicast bearer for group communications as performed by the control node 300 according to an embodiment.

As disclosed above, according to the embodiments disclosed herein the control node 300 instructs the client nodes 200a, 200b, 200c whether or not the client nodes 200a, 200b, 200c is to report service interruption. Hence, the control node 300 is configured to perform step S202:

S202: The control node 300 transmits instruction whether or not a client node 200a, 200b, 200c listening to the multicast bearer is to report service interruption of the multicast bearer.

The instruction could comprise identification information, such an address, an identity, or any other information that uniquely could be used to identify a subset of those client nodes 200a, 200b, 200c that are to report service interruption of the multicast bearer. This could help the control node 300 to keep track of which client nodes 200a, 200b, 200c that are to report service interruption of the multicast bearer and which client nodes 200a, 200b, 200c that are to not report service interruption of the multicast bearer.

As disclosed above, the client node 200a in a step S110 reports the service interruption to the control node 300. Hence, the control node 300 is configured to perform step S204:

S204: The control node 300 obtains reporting of service interruption of the multicast bearer from the client node 200a instructed to report failure of the multicast bearer.

Embodiments relating to further details of service interruption reporting of a multicast bearer for group communications as performed by the control node 300 will now be disclosed.

Reference is now made to FIG. 5 illustrating methods for service interruption reporting of a multicast bearer for group communications as performed by the control node 300 according to further embodiments. It is assumed that steps S202, S204 are performed as described above with reference to FIG. 4 and a thus repeated description thereof is therefore omitted.

There may be different ways for the control node 300 to transmit the instruction in step S202. As disclosed above, the instruction could be transmitted during a service announcement procedure of the multicast bearer or in a service announcement update of the multicast bearer. Hence, according to an embodiment the instruction is broadcast during a service announcement procedure of the multicast bearer or in a service announcement update of the multicast bearer. In general terms, the service announcement provides information to the client nodes 200a, 200b, 200c on the identity of the multicast bearer and how to receive the service over the multicast bearer. The multicast bearer service announcement message may be transmitted by a unicast transmission to each client node 200a, 200b, 200c or in a broadcast message to all client nodes 200a, 200b, 200c in the radio coverage area 120.

According to some aspects only subset of the client nodes 200a, 200b, 200c are to report the service interruption. Hence, according to an embodiment the instruction instructs only a selected subset of client nodes 200a, 200b, 200c to report service interruption of the multicast bearer. The control node 300 may thus be configured to transmitting the instruction in step S202 to a subset of all the client nodes 200a, 200b, 200c. Client nodes that are not part of the subset are thus not to report the service interruption.

There could be different ways for the control node 300 to select how many client nodes 200a, 200b, 200c are to be members of the subset.

According to some aspects the number of members in the subset is based on the total number of client nodes 200a, 200b, 200c. Hence, according to an embodiment the number of members of the selected subset is based on the total number of client nodes 200a, 200b, 200c listening to the multicast bearer. As an example, the subset could comprise of a fixed percentage, such as in the range of 10%, of the total number of client nodes 200a, 200b, 200c listening to the multicast bearer.

Further, there could be different ways for the control node 300 to select which client nodes 200a, 200b, 200c are to be members of the subset. Consideration could be taken to the location of the client nodes 200a, 200b, 200c, since location of the client nodes 200a, 200b, 200c could be dynamically changed. According to some aspects which client nodes 200a, 200b, 200c to be members of the subset is therefore based on the service area (e.g., based on location information of the client nodes 200a, 200b, 200c as reported by the client nodes 200a, 200b, 200c in step S104). Hence, according to an embodiment the members of the selected subset are selected based on location information as obtained by the control node 300 from the client nodes 200a, 200b, 200c. This means that the instruction transmitted to the client nodes 200a, 200b, 200c for reporting service interruption may need to be updated based on new members entering the multicast bearer service area (and hence being part of the subset). Hence, the control node 300 could be configured to transmit the instruction as in step S202 upon the subset having been updated. Hence, the control node 300 could reevaluate the subset of client nodes 200a, 200b, 200c based on the location information reported from the client nodes 200a, 200b, 200c in step S104 which thus is dynamically updated when the client nodes 200a, 200b, 200c move. That is, according to an embodiment the control node 300 is configured to update the subset based on a pre-defined set of rules. One such rule could be based on the location of the client nodes 200a, 200b, 200c listening to the multicast bearer. Alternatively, the members of the selected subset are randomly selected (out of the client nodes 200a, 200b, 200c listening to the multicast bearer). Hence, another rule could be that the members of the selected subset are randomly selected when the subset of client nodes 200a, 200b, 200c is updated. Another rule could be based on any combination of the rules mentioned above.

Embodiments relating to mechanisms for the control node 300 to keep track of which client nodes 200a, 200b, 200c are listening to the multicast bearer have been disclosed above.

There could be different ways for the control node 300 upon having obtained reporting of the service interruption in step S204.

According to some aspects the control node 300 responds to the reporting by moving the service of the multicast bearer to another bearer. Hence, according to an embodiment a service is sent on the multicast bearer and the control node 300 is configured to perform steps S206, S208 upon having obtained the reporting of service interruption in step S204:

S206: The control node 300 moves the service to another bearer.

S208: The control node 300 transmits a service announcement of this another bearer.

The so-called another bearer could be a multicast bearer or a unicast bearer. Step S208 could be omitted if the bearer is a unicast bearer.

According to some aspects the control node 300 responds to the reporting by queuing the service until the multicast bearer is resumed. Hence, according to an embodiment a service is sent on the multicast bearer and the control node 300 is configured to perform step S210 upon having obtained the reporting of service interruption in step S204:

S210: The control node 300 queues the service until the multicast bearer is resumed or until another bearer is available for sending the service.

According to some aspects the control node 300 responds to the reporting by selecting to suspend certain low prioritized services and setting up unicast bearers only to high priority services. Hence, according to an embodiment a service is sent on the multicast bearer and the control node 300 is configured to perform step S212 upon having obtained the reporting of service interruption in step S204:

S212: The control node 300 moves the service to a unicast bearer.

There could be different reasons for the service interruption. According to some aspects the service interruption is caused by bearer failure. Hence, according to an embodiment the service interruption is caused by multicast bearer failure detected by the client nodes 200a, 200b, 200c. There could be different events causing the bearer failure. As an example the multicast bearer could be suspended or pre-empted. If the multicast bearer is subjected to strong interference then the client node 200a and/or wireless device 150a could just report this as experiencing a network performance degradation in a listening report.

There could be different examples of multicast bearers. According to an embodiment the multicast bearer is an MBMS bearer.

Figure 6:
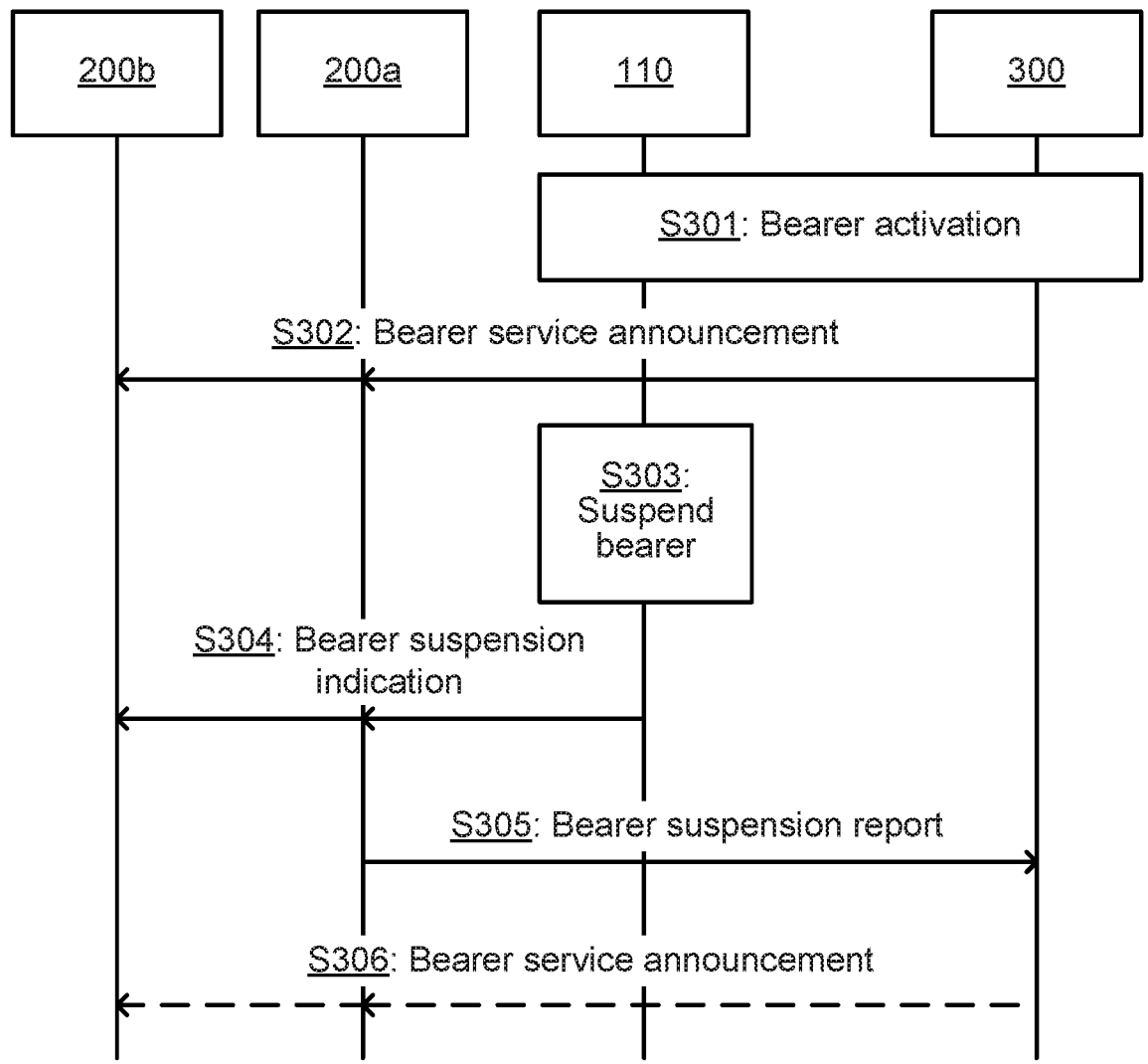
FIG. 6 is a signalling diagram of a method according to an embodiment.

One particular embodiment for service interruption reporting of a multicast bearer (provided as an MBMS bearer) for group communications based on at least some of the above disclosed embodiments will now be disclosed in detail with reference to the signalling diagram of FIG. 6.

S301: The MBMS bearer is activated by the control node 300 and the RAN node 110.

S302: During an MBMS bearer announcement procedure instructions are sent from the control node 300 (via the RAN node 110) to client nodes 200a, 200b, 200c to at least some of the client nodes 200a, 200b, 200c to report detection of MBMS bearer outage. In the illustrative examples it is assumed that client node 200a is instructed to report detection of MBMS bearer outage.

S303: The RAN node 110 decides to suspend the MBMS bearer. In a 3GPP based network the RAN node 110 transmits a suspension indicator such that the client nodes 200a, 200b, 200c (via its hosting wireless device 150a, 150b, 150c) can detect that the MBMS bearer has been suspended. The RAN node 110 could decide to suspend the MBMS bearer according to existing procedures in 3GPP TS 36.300 v14.0.0.

S304: The RAN node 110 sends an MBMS suspension indication. The MBMS suspension indication could be sent in the MSI (Multicast channel Scheduling Information) according to existing procedures in 3GPP TS 36.300 v14.0.0. The client nodes 200a, 200b, 200c are thereby enabled to detect that the MBMS bearer has been suspended.

S305: The client node 200a that has received instruction to send an MBMS bearer suspension notification to the group communication server sends this notification to the control node 300 in an MBMS bearer suspension report.

S306: The control node 300, optionally, based on receiving the notification sent in step S305, informs all client nodes 200a, 200b, 200c in the MBMS service area of alternative ways of receiving the MBMS service by sending an MBMS bearer service announcement.

Figure 7:
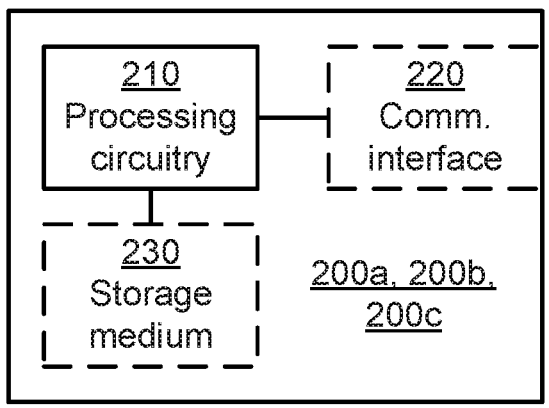
FIG. 7 is a schematic diagram showing functional units of a client node according to an embodiment.

FIG. 7 schematically illustrates, in terms of a number of functional units, the components of a client node 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110a (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the client node 200a to perform a set of operations, or steps, S102-S112, as disclosed above. For example, the storage medium 230 may store the set of operations, and the processing circuitry 210 may be configured to retrieve the set of operations from the storage medium 230 to cause the client node 200a to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The client node 200a may further comprise a communications interface 220 for communications at least with the control node 300. As such the communications interface 220 may comprise one or more transmitters and receivers, comprising analogue and digital components.

The processing circuitry 210 controls the general operation of the client node 200a e.g. by sending data and control signals to the communications interface 220 and the storage medium 230, by receiving data and reports from the communications interface 220, and by retrieving data and instructions from the storage medium 230. Other components, as well as the related functionality, of the client node 200a are omitted in order not to obscure the concepts presented herein.

Figure 8:
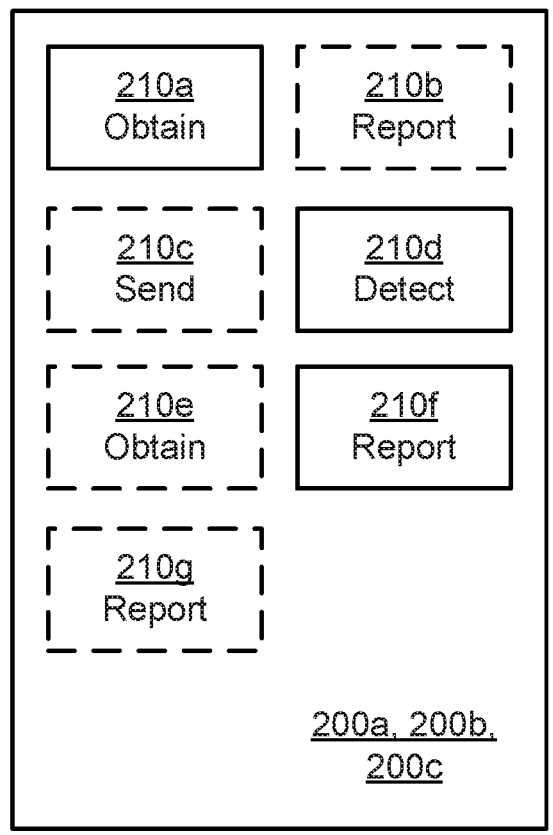
FIG. 8 is a schematic diagram showing functional modules of a client node according to an embodiment.

FIG. 8 schematically illustrates, in terms of a number of functional modules, the components of a client node 200a according to an embodiment. The client node 200a of FIG. 8 comprises a number of functional modules; an obtain module 210a configured to perform step S102, a detect module 210d configured to perform step S108, and a report module 210f configured to perform step S110. The client node 200a of FIG. 8 may further comprise a number of optional functional modules, such as any of a report module 210b configured to perform step S104, a send module 210c configured to perform step S106, an obtain module 210e configured to perform step S108a, and a report module 210g configured to perform step S112. In general terms, each functional module 210a-210g may be implemented in hardware or in software. Preferably, one or more or all functional modules 210a-210g may be implemented by the processing circuitry 210, possibly in cooperation with functional units 220 and/or 230. The processing circuitry 210 may thus be arranged to from the storage medium 230 fetch instructions as provided by a functional module 210a-210g and to execute these instructions, thereby performing any steps of the client node 200a as disclosed herein.

In general terms, each functional module 210a-210g may in one embodiment be implemented only in hardware or and in another embodiment with the help of software, i.e., the latter embodiment having computer program instructions stored on the storage medium 230 which when run on the processing circuitry makes the client node 200a perform the corresponding steps mentioned above in conjunction with FIGS. 2 and 3. It should also be mentioned that even though the modules correspond to parts of a computer program, they do not need to be separate modules therein, but the way in which they are implemented in software is dependent on the programming language used. Preferably, one or more or all functional modules 210a-210g may be implemented by the processing circuitry 210, possibly in cooperation with functional units 220 and/or 230. The processing circuitry 210 may thus be configured to from the storage medium 330 fetch instructions as provided by a functional module 210a-210g and to execute these instructions, thereby performing any steps as disclosed herein.

The client node 200a may be provided as a standalone device or as a part of at least one further device. For example, the client node 200a may be hosted by, provided in, or installed on a wireless device 150a.

Figure 9:
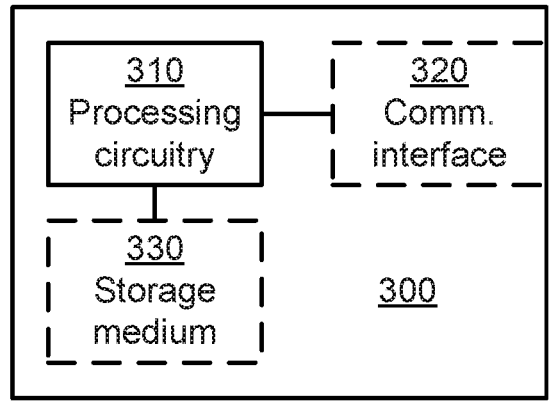
FIG. 9 is a schematic diagram showing functional units of a control node according to an embodiment.

FIG. 9 schematically illustrates, in terms of a number of functional units, the components of a control node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1110b (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the control node 300 to perform a set of operations, or steps, S202-S212, as disclosed above. For example, the storage medium 330 may store the set of operations, and the processing circuitry 310 may be configured to retrieve the set of operations from the storage medium 330 to cause the control node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The control node 300 may further comprise a communications interface 320 for communications at least with the client nodes 200a, 200b, 200c. As such the communications interface 320 may comprise one or more transmitters and receivers, comprising analogue and digital components.

The processing circuitry 310 controls the general operation of the control node 300 e.g. by sending data and control signals to the communications interface 320 and the storage medium 330, by receiving data and reports from the communications interface 320, and by retrieving data and instructions from the storage medium 330. Other components, as well as the related functionality, of the control node 300 are omitted in order not to obscure the concepts presented herein.

Figure 10:
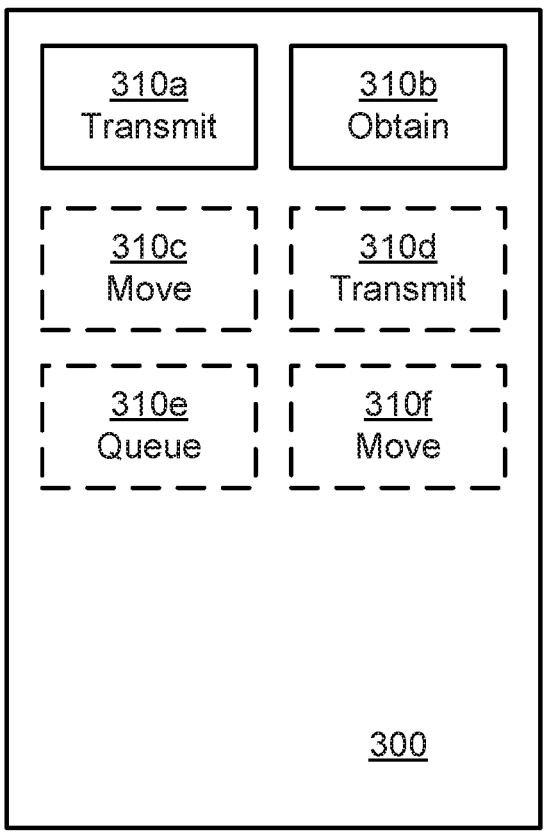
FIG. 10 is a schematic diagram showing functional modules of a control node according to an embodiment.

FIG. 10 schematically illustrates, in terms of a number of functional modules, the components of a control node 300 according to an embodiment. The control node 300 of FIG. 10 comprises a number of functional modules; a transmit module 310a configured to perform step S202, and an obtain module 310b configured to perform step S204. The control node 300 of FIG. 10 may further comprise a number of optional functional modules, such as any of a move module 310c configured to perform step S206, a transmit module 310d configured to perform step S208, a queue module 310e configured to perform step S210, and a move module 310f configured to perform step S212. In general terms, each functional module 310a-310f may be implemented in hardware or in software. Preferably, one or more or all functional modules 310a-310f may be implemented by the processing circuitry 310, possibly in cooperation with functional units 320 and/or 330. The processing circuitry 310 may thus be arranged to from the storage medium 330 fetch instructions as provided by a functional module 310a-310f and to execute these instructions, thereby performing any steps of the control node 300 as disclosed herein.

In general terms, each functional module 310a-310f may in one embodiment be implemented only in hardware or and in another embodiment with the help of software, i.e., the latter embodiment having computer program instructions stored on the storage medium 330 which when run on the processing circuitry makes the control node 300 perform the corresponding steps mentioned above in conjunction with FIGS. 4 and 5. It should also be mentioned that even though the modules correspond to parts of a computer program, they do not need to be separate modules therein, but the way in which they are implemented in software is dependent on the programming language used. Preferably, one or more or all functional modules 310a-310f may be implemented by the processing circuitry 310, possibly in cooperation with functional units 320 and/or 330. The processing circuitry 310 may thus be configured to from the storage medium 330 fetch instructions as provided by a functional module 310a-310f and to execute these instructions, thereby performing any steps as disclosed herein.

The control node 300 may be provided as a standalone device or as a part of at least one further device. For example, the control node 300 may be hosted by, provided in, or installed on a GCS AS or an MC service server.

Figure 11:
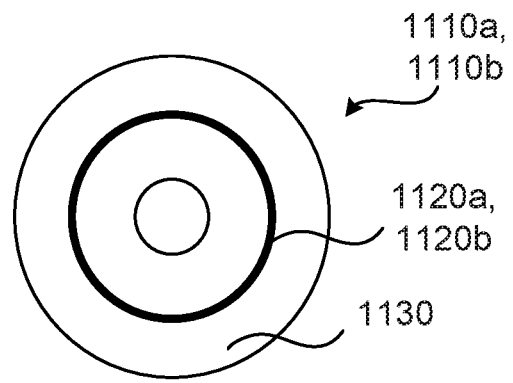
FIG. 11 shows one example of a computer program product comprising computer readable means according to an embodiment.

FIG. 11 shows one example of a computer program product 1110a, 1110b comprising computer readable means 1130. On this computer readable means 1130, a computer program 1120a can be stored, which computer program 1120a can cause the processing circuitry 210 and thereto operatively coupled entities and devices, such as the communications interface 220 and the storage medium 230, to execute methods according to embodiments described herein. The computer program 1120a and/or computer program product 1110a may thus provide means for performing any steps of the client node 200a as herein disclosed. On this computer readable means 1130, a computer program 1120b can be stored, which computer program 1120b can cause the processing circuitry 310 and thereto operatively coupled entities and devices, such as the communications interface 320 and the storage medium 330, to execute methods according to embodiments described herein. The computer program 1120b and/or computer program product 1110b may thus provide means for performing any steps of the control node 300 as herein disclosed.

In the example of FIG. 11, the computer program product 1110a, 1110b is illustrated as an optical disc, such as a CD (compact disc) or a DVD (digital versatile disc) or a Blu-Ray disc. The computer program product 1110a, 1110b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120a, 1120b is here schematically shown as a track on the depicted optical disk, the computer program 1120a, 1120b can be stored in any way which is suitable for the computer program product 1110a, 1110b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for service interruption reporting of a multicast bearer for group communications, the method being performed by a client node, the method comprising:
obtaining instruction from a control node of the multicast bearer, where the instruction instructs whether or not the client node is to report service interruption of the multicast bearer;
detecting service interruption of the multicast bearer; and
selectively reporting the service interruption to the control node in accordance with the instruction.

2. The method according to claim 1, wherein the instruction is obtained during a service announcement procedure of the multicast bearer.

3. The method according to claim 1, wherein detecting service interruption of the multicast bearer comprises:
obtaining a suspension indication of the multicast bearer from a radio access network node of the multicast bearer.

4. The method according claim 1, wherein the service interruption is reported in a multicast bearer suspension report or in a listening report.

5. The method according to claim 1, wherein the instruction further instructs the client node to report location, the method further comprising:
reporting location of the client node to the control node in accordance with the instruction.

6. The method according to claim 1, wherein the instruction further instructs the client node to send keepalive, KA, signals if the client node is instructed to report service interruption of the multicast bearer, the method further comprising:
selectively sending the KA signals to the control node in accordance with the instruction.

7. The method according to claim 1, wherein the instruction further instructs the client node to report shutdown if the client node is instructed to report service interruption of the multicast bearer, the method further comprising:
selectively reporting shutdown of the client node to the control node in accordance with the instruction.

8. The method according to claim 1, wherein the service interruption is caused by multicast bearer failure detected by the client nodes.

9. The method according to claim 1, wherein the multicast bearer is a Multimedia Broadcast Multicast Services, MBMS, bearer.

10. A method for service interruption reporting of a multicast bearer for group communications, the method being performed by a control node of the multicast bearer, the method comprising:
transmitting an instruction indicating whether or not a client node listening to the multicast bearer is to report service interruption of the multicast bearer; and
obtaining reporting of service interruption of the multicast bearer from the client node instructed to report failure of the multicast bearer.

11. The method according to claim 10, wherein the instruction is broadcast during a service announcement procedure of the multicast bearer.

12. The method according to claim 10, wherein the instruction instructs a selected subset of client nodes to report service interruption of the multicast bearer.

13. The method according to claim 12, wherein members of the selected subset are selected based on location information obtained from the client nodes.

14. The method according to claim 12, wherein members of the selected subset are randomly selected.

15. The method according to claim 12, wherein number of members of the selected subset is based on total number of client nodes listening to the multicast bearer.

16. The method according to claim 10, wherein a service is sent on the multicast bearer, the method further comprising, upon having obtained the reporting of service interruption:
moving the service to another bearer; and
transmitting a service announcement of said another bearer.

17. The method according to claim 10, wherein a service is sent on the multicast bearer, the method further comprising, upon having obtained the reporting of service interruption:

queuing the service until the multicast bearer is resumed or until another bearer is available for sending the service.

18. The method according to claim 10, wherein a service is sent on the multicast bearer, the method further comprising, upon having obtained the reporting of service interruption:

moving said service to a unicast bearer.

19. A client node for service interruption reporting of a multicast bearer for group communications, the client node comprising:

processing circuitry; and a storage medium storing instructions that, when executed by the processing circuitry, cause the client node to:

obtain instruction from a control node of the multicast bearer, where the instruction instructs whether or not the client node is to report service interruption of the multicast bearer;

detect service interruption of the multicast bearer; and selectively report the service interruption to the control node in accordance with the instruction.

20. A control node for service interruption reporting of a multicast bearer for group communications, the control node comprising:

processing circuitry; and a storage medium storing instructions that, when executed by the processing circuitry, cause the control node to:

transmit an instruction indicating whether or not a client node listening to the multicast bearer is to report service interruption of the multicast bearer; and obtain reporting of service interruption of the multicast bearer from the client node instructed to report failure of the multicast bearer.

21. A non-transitory computer readable recording medium storing a computer program product for service interruption reporting of a multicast bearer for group communications, the computer program product comprising software instructions which, when run on processing circuitry of a client node, causes the client node to:

obtain instruction from a control node of the multicast bearer, where the instruction instructs whether or not the client node is to report service interruption of the multicast bearer;

detect service interruption of the multicast bearer; and selectively report the service interruption to the control node in accordance with the instruction.

22. A non-transitory computer readable recording medium storing a computer program product for service interruption reporting of a multicast bearer for group communications, the computer program product comprising software instructions which, when run on processing circuitry of a control node, causes the control node to:

transmit an instruction indicating whether or not a client node listening to the multicast bearer is to report service interruption of the multicast bearer; and obtain reporting of service interruption of the multicast bearer from the client node instructed to report failure of the multicast bearer.

* * * * *

UNITED STATES PATENT AND TRADEMARK OFFICE
CERTIFICATE OF CORRECTION

PATENT NO. : 10,848,369 B2
APPLICATION NO. : 16/392811
DATED : November 24, 2020
INVENTOR(S) : Tränk et al.

It is certified that error appears in the above-identified patent and that said Letters Patent is hereby corrected as shown below:

In the Specification

In Column 1, Line 6, delete "2017," and insert -- 2017, now Pat. No. 10,348,552, --, therefor.

In Column 7, Line 28, delete "step s102" and insert -- step S102 --, therefor.

In the Claims

In Column 16, Line 4, in Claim 4, delete "according claim 1," and insert -- according to claim 1, --, therefor.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*